United States Patent [19]

Ziegler et al.

[11] Patent Number: 4,693,909

[45] Date of Patent: Sep. 15, 1987

[54] AQUEOUS WAX DISPERSIONS AS PRESERVATIVES FOR METAL SURFACES AND SURFACES OF COATINGS, THEIR USE AND A PROCESS FOR PRESERVING METAL SURFACES AND SURFACES OF COATINGS

[75] Inventors: Walter Ziegler, Edingen-Neckarhausen; Wolfram Dietsche, Frankenthal; Stefan Weiss, Neckargemuend; Richard Mueller, Bad Durkheim; Albert Hettche, Hessheim; Klaus Glaser, Mutterstadt; Christos Vamvakaris, Kallstadt, all of Fed. Rep. of Germany

[73] Assignee: BASF Aktiengesellschaft, Ludwigshafen, Fed. Rep. of Germany

[21] Appl. No.: 843,306

[22] Filed: Mar. 24, 1986

[51] Int. Cl.$^4$ .................... B65B 33/00; B05D 3/02
[52] U.S. Cl. ........................... 427/156; 106/271; 106/272; 427/388.1
[58] Field of Search ............... 427/388.2, 156, 388.1; 106/271, 272

[56] References Cited

U.S. PATENT DOCUMENTS

| | | | |
|---|---|---|---|
| 3,492,258 | 1/1970 | Kremer | 427/156 X |
| 3,620,796 | 11/1971 | Gordy | 427/156 X |
| 3,625,727 | 12/1971 | Lightfoot et al. | 427/156 |
| 3,843,574 | 10/1974 | Apikos | 427/156 X |
| 4,065,590 | 12/1977 | Salensky | 427/236 X |
| 4,315,957 | 2/1982 | Hereth et al. | 427/155 |

Primary Examiner—Thurman K. Page
Attorney, Agent, or Firm—Oblon, Fisher, Spivak, McClelland, & Maier

[57] ABSTRACT

A liquid preservative for plated or unplated metal surfaces and surfaces of coatings, in the form of an aqueous wax dispersion which contains a special ethylene/acrylic acid copolymer wax, consisting of from 8 to 25% by weight of acrylic acid units and from 92 to 75% by weight of ethylene units, in partially or completely neutralized form, if appropriate as a mixture with waxes based on polyethylene oxidation products and/or hydrocarbon waxes, the use of this special ethylene/acrylic acid copolymer wax for preserving plated or unplated metal surfaces and surfaces of coatings, and a process for temporarily preserving metal surfaces and surfaces of coatings.

9 Claims, No Drawings

AQUEOUS WAX DISPERSIONS AS PRESERVATIVES FOR METAL SURFACES AND SURFACES OF COATINGS, THEIR USE AND A PROCESS FOR PRESERVING METAL SURFACES AND SURFACES OF COATINGS

The present invention relates to a liquid preservative for metal surfaces which may or may not be plated and for surfaces of coatings, which is based on a partially or completely neutralized special ethylene/acrylic acid copolymer wax dispersed in water, if desired as a mixture with other waxes, its use as a preservative for metal surfaces which may or may not be plated and for surfaces of coatings, and a process for preserving these surfaces.

Preservatives for the temporary protection of metal surfaces are used in particular in the automotive industry. These are intended to protect the coated metal car body parts from harmful environmental effects and damage during transport for the period between production and transfer to the customer. The preservatives used must not themselves have an adverse effect, particularly on the finish and must be capable of being removed again in a simple manner after they have fulfilled their purpose. The plated metal surfaces used are in particular zinc surfaces. Here, the preservatives used should not themselves have an adverse effect, particularly on the zinc surfaces, e.g. changes in gloss or ductility.

Some of the systems used to date, such as that described in German Pat. No. 1,669,155 and consisting of wax acids which may or may not have been neutralized with alkali or alkaline earths and are mixed with paraffins, polyolefin waxes or ozocerites, have the disadvantage that they are used as solutions or dispersions in organic solvents. The solvents, in particular gasolene, evaporate and hence enter the environment; this is a serious disadvantage. Attempts have therefore been made to replace the organic solvent systems by aqueous systems. According to German Published Application DAS No. 1,227,592, for example, this has been only partially successful. Although the solvent content can be reduced, it cannot be completely eliminated.

Other systems which manage without organic solvents, e.g. the water-containing liquid preservative described in German Laid-Open Application DOS No. 2,926,197, which is a mixture of acids or ester waxes based on montan waxes, natural waxes and hydrocarbon waxes with basic hydrolyzing agents, e.g. alkali metal hydroxides or ethanolamines, cannot dispense with emulsifiers, which in certain circumstances have the disadvantage that they diffuse out of the protective layer and, especially over a prolonged residence time and at fairly high temperatures, also have an adverse effect on the finish. Furthermore, it is known that in certain circumstances the alkali metal hydroxides used attack the surfaces of a finish on freshly coated metal articles.

German Laid-Open Application DOS No. 1,519,220 describes wax mixtures which may contain water-soluble acrylic polymers, for the protection of metal surfaces. The solution to the problem described therein is not optimum since the water-soluble polymers used do not provide adequate protection under weathering conditions.

It is an object of the present invention to provide a water-based preservative for metal surfaces which may or may not be plated, and for surfaces of coatings, which contains no organic solvents at all, manages as far as possible without emulsifiers and with very little alkali or without alkali, and has a low drying temperature. The film-formers used should be water-insoluble but dispersible in water.

We have found that this object is achieved by a liquid preservative for metal surfaces which may or may not be plated and for surfaces of coatings, in the form of an aqueous wax dispersion, wherein the said dispersion contains from 10 to 30% by weight of an ethylene/acrylic acid copolymer wax (referred to below as E-AA wax), consisting of from 8 to 25% by weight of acrylic acid units and from 92 to 75% by weight of ethylene units, the percentages being based on the acid form of the wax, and water to make up to 100% by weight, the E-AA wax in the acid form having a melt viscosity of not less than 1000 $mm^2/s$, measured at 120° C., as a lower limit and an MFI of not less than 1, measured at 125° C. and 325 g, as an upper limit of the molecular weight characterized by the viscosity, and from 50 to 100 mol % of the carboxyl groups of the E-AA wax being neutralized, and, if required, from 0.1 to 5% by weight, based on the total weight, of conventional assistants apart from emulsifiers are furthermore added to the wax dispersion.

Using the special E-AA wax defined above, a purely aqueous, emulsifier-free dispersion possessing excellent performance characteristics can be prepared. The novel dispersion is particularly useful for preserving coated metal surfaces on automobiles, trucks and agricultural vehicles, and zinc-plated surfaces, such as zinc-plate tool components, workpieces or articles of use. Its particular usefulness is due to the balanced hydrophilic/hydrophobic character of the E-AA wax.

While in the preservation of metal surfaces generally, in particular coated surfaces, it is important that the protective films are capable of being removed easily, in the case of the plated surfaces, permanent protection is the principal requirement.

For the purposes of the present invention, plated surfaces are metal surfaces, for example those of iron and steel and their alloys and of copper, on which, in particular, nickel, copper or zinc have been deposited electrochemically. Zinc-plated surfaces, as surfaces preferably to be treated, are those which have been deposited on, for example, iron or steel with the aid of an acidic or alkaline zinc bath familiar to the skilled worker, and, if required, have been chromatized.

According to the invention, E-AA waxes consisting of from 12 to 22% by weight of acrylic acid and from 88 to 72% by weight of ethylene are preferred.

Preferably, from 65 to 100 mol % of the carboxyl groups present are neutralized.

The carboxyl groups of the wax used according to the invention are partially or completely neutralized with ammonia or one or more aliphatic alkylamines which are substituted or unsubstituted by one or more hydroxyl groups. Particularly suitable alkylamines are mono-, di- and trialkanolamines where hydroxyalkyl is of 1 to 10, preferably 2 to 6, carbon atoms, monoalkyl dialkanolamines and dialkanol monoalkylamines where hydroxyalkyl is of 2 to 6 carbon atoms and alkyl is of 1 to 6 carbon atoms. It is of course also possible to use mixtures of the stated bases. Specific examples of the substituted amines are diethanolamine, triethanolamine, triisopropylamine, 2-amino-2-methylpropanol, dimethylethanolamine and diethylethanolamine. Up to 30% of the carboxyl groups present may be neutralized with an alkali metal hydroxide, in particular sodium hydroxide or potassium hydroxide.

The carboxyl groups are particularly preferably neutralized with ammonia or a dimethylethanolamine or diethylethanolamine or a mixture of these with ammonia, or, in the case of plated metal surfaces, particularly preferably with dimethylethanolamine, diethylethanolamine or triethanolamine or a mixture of these.

It should be pointed out that, for practical reasons, the amount of E-AA wax present in the novel wax dispersions is based on the acid form of the said wax, although a partially or completely neutralized wax is actually used. Data relating to the solids content or content of dry matter in the dispersions do of course include the bases used for neutralization, unless expressly stated otherwise.

Since it may be extremely complicated to carry out an exact molecular weight determination for the E-AA waxes used according to the invention, for the sake of simplicity the substances are characterized not by the molecular weights or molecular weight ranges but by the viscosity, measured in molten form as a melt viscosity or MFI. For the skilled worker, these viscosities represent meaningful values conforming to practice.

It is expressly pointed out that the viscosities are measured on the E-AA waxes in the acid form and not on the partially or completely neutralized waxes.

In the case of the low molecular weight products, the melt viscosity is preferably determined according to DGF standard method C-IV 7 (68) in a capillary viscometer, a melt at 120° C. running through a capillary, and the time of the passage being measured.

Low melt viscosities correspond to low molecular weights, while higher melt viscosities correspond to higher molecular weights. The melt viscosities essential for the invention are not less than 1000, preferably from 2000 to 15000 mm$^2$/s, measured at 120° C.

High melt viscosities of above 12000–15000 mm$^2$/s become increasingly difficult to measure and are no longer maningful. Above certain high molecular weights of the E-AA waxes, the melt viscosities can no longer be determined so that, to characterize the upper limit of the molecular weight ranges, advantageously to determine the viscosity, the MFI values, measured at 125° C. and 325 g, are used. In terms of magnitude, the melt vis-cosity of 12000 mm$^2$/s is roughly equivalent to an MFI of 190, measured at 125° C. and 325 g.

The MFI (melt flow index) indicates the amount of polymer melt in grams which can be forced, at a specified temperature, through a nozzle of specified dimensions, using a specified force (load). The melt flow index (MFI units) is determined by the following standard methods, which are identical to one another: ASTM D 1238–65 T, ISO R 1133–1696 (E) or DIN 53735 (1970).

A high MFI indicates a relatively low molecular weight, whereas a low MFI corresponds to a relatively high molecular weight.

The MFI values essential for the invention are from 600 to 1, preferably from 500 to 10. Thus, an MFI of not less than 1 corresponds to the upper limit of the molecular weight.

In general, it may be stated that the molecular weight of the E-AA wax should not be too high since it may be more difficult to remove. For example, a polymeric E-AA wax which contains 17% of acrylic acid, corresponding to an acid number of 127, and has a wax hardness of 350–450 bar, a melting point of 91°–108° C. and an MFI of 8 is still very useful. The low molecular weight grades having MFI values of from 500 to 10 are advantageous. The E-AA waxes having higher molecular weights, i.e. those possessing lower MFI values, can still be employed, but their usefulness diminishes constantly or steadily increasing requirements have to be met when processing these waxes in order to maintain the performance characteristics.

As stated above, in addition to emulsifiers, conventional assistants in amounts of from 0.1 to 5, preferably from 0.5 to 2, % by weight, based on the total mixture, may advantageously be added to the total mixture.

Particularly suitable substances in this respect are:

antifoams, such as ethylene oxide/propylene oxide block polymers, containing from 5 to 50 EO/PO units, of fatty alcohols of 8 to 20 carbon atoms, diols and triols, such as ethylene glycol, and ethylenediamines, advantageously in an amount of from 0.5 to 1, based on the total mixture, leveling agents, such as potassium salt or N-ethyl-N-perfluorooctanesulfonylglycine, advantageously in an amount of from 0.1 to 0.5% by weight, based on the total mixture, and furthermore anticorrosion agents, such as N-(2-ethylhexyl)-succinic acid monoamide, N-2-ethylhexylphthalic acid monoamide, phenylsulfonylamidocaproic acid, diisobutenylsuccinic acid or Medialan acid, in an amount of from 0.1 to 0.5% by weight, based on the total mixture.

In the preferred embodiments, particularly for the temporary protection of metal surfaces and surfaces of coatings, the novel liquid preservative additionally contains a wax based on a polyethylene oxidation product, in this case together with a nonionic emulsifier, or contains a synthetic or natural hydrocarbon wax or a mixture of these.

Suitable waxes based on polyethylene oxidation products are known and are available commercially. They possess an acid number of from 18 to 25 and a weight average molecular weight of from 2000 to 10000.

Synthetic and natural hydrocarbon waxes are, in particular, the conventional polyethylene waxes having molecular weights of from 500 to 6000 and melting points of from 40° to 110° C., as well as natural paraffin of melting point 40°–100° C. For the stated hydrocarbon waxes, the preferred melting range is from 40° 70° C.

In practice, the waxes based on polyethylene oxidation products and the hydrocarbon waxes, which are additionally used, are frequently added to a novel dispersion, in the form of an aqueous dispersion prepared for this specific purpose. However, it is also possible for the additional waxes to be dispersed directly in the mixture.

In particular, the waxes based on polyethylene oxidation products are advantageously used in the form of an aqueous dispersion, in which the carboxyl groups are partially or completely neutralized with an alkali metal hydroxide, in particular sodium hydroxide or potassium hydroxide, and which contains a nonionic emulsifier such as a reaction product of a fatty alcohol or oxoalcohol of 10 to 16 carbon atoms with from 5 to 100 ethylene oxide units, preferably a reaction product of a C$_{10}$ fatty alcohol with about 7 ethylene oxide units.

Such an added emulsion of a wax based on a polyethylene oxidation product contains, for example, from 20 to 27% by weight of a wax based on a polyethylene oxidation product, having an acid number of from 18 to 25 and a weight average molecular weight of from 2000 to 10000 and from 0.5 to 0.8% by weight of an alkali metal hydroxide, in particular sodium hydroxide or potassium hydroxide, with or without from 2.5 to 2.8% by weight of a nonionic emulsifier, and water to make up to 100% by weight. In this connection, it should be noted that the presence of emulsifiers is advantageous in the case of emulsions of waxes based on polyethylene oxidation products.

The invention therefore preferably relates to a wax dispersion as claimed in claim 1, to which is added from 15 to 25% by weight of an emulsion of a wax based on a polyethylene oxidation product, consisting of from 20 to 27% by weight of a wax of this type with an acid number of from 18 to 25 and a weight average molecular weight of from 2000 to 10000, from 0.5 to 0.8% by weight of an alkali metal hydroxide, from 2.5 to 2.8% by weight of a nonionic emulsifier and water to make up to 100% by weight, the percentages being based on the weight of the said wax dispersion, with the proviso that the total dispersion has a solids content of from 10 to 35% by weight, if appropriate after the addition of water.

The present invention furthermore preferably relates to a wax dispersion as claimed in claim 1, to which is added from 40 to 80% by weight, based on the weight of the said dispersion, of a synthetic or natural hydrocarbon wax, with the proviso that the total dispersion has a solids content of from 30 to 65% by weight, if appropriate after the addition of water.

In another embodiment of the invention, mixtures of the abovementioned waxes based on polyethylene oxidation products and hydrocarbon waxes are added to a wax dispersion as claimed in claim 1.

These are wax dispersions as claimed in claim 1, to which are added from 25 to 100% by weight of an emulsion of a wax based on a polyethylene oxidation product, consisting of from 20 to 27% by weight of a wax of the stated type having an acid number of from 18 to 25 and a weight average molecular weight of from 2000 to 10000, from 0.5 to 0.8% by weight of an alkali metal hydroxide, from 2.5 to 2.8% by weight of a nonionic emulsifier and water to make up to 100% by weight, and from 15 to 200% by weight of a synthetic or natural hydrocarbon wax, the percentages being based on the weight of the said wax dispersion, with the proviso that the total dispersion has a solids content of from 30 to 65% by weight, if appropriate after the addition of water.

The stated solids contents of from 10 to 35% by weight or from 30 to 65% by weight for the total dispersion correspond to the contents advantageously employed in practice. The desired contents are obtained by adding water, if necessary.

The present invention furthermore relates to the use of E-AA waxes in the form of the dispersions defined above, for the temporary protection of metal surfaces and surfaces of coatings, the dispersions without waxes based on the polyethylene oxidation products or hydrocarbon waxes being particularly preferred for protecting plated metal surfaces, in particular zinc-plated surfaces which may or may not be chromatized.

The present invention furthermore relates to a process for the temporary preservation of plated or unplated metal surfaces and surfaces of coatings, wherein the aqueous dispersions defined above are applied to the metal surfaces and surfaces of coatings in a conventional manner and then dried, preferably at from 20° to 60° C.

The surprising advantage of the invention is that, after application and drying, a very resistant protective layer is formed; although applied as a purely aqueous dispersion with partially or completely neutralized carboxyl groups, the said layer is very water-resistant and, after fulfilling its task, is easy to remove.

Investigations have shown that, when mixed with paraffins, emulsions of waxes based on polyethylene oxidation products are unsuitable in practice, as is evident from the examples, since they do not give satisfactory results in performance characteristics tests, particularly with regard to their resistance to cold water. Hence, the present invention relates in particular to emulsions based on polyethylene oxidation products and mixed with the emulsifier-free E-AA wax emulsions used according to the invention, for improving the resistance to cold water. The wax dispersions additionally containing waxes based on polyethylene oxidation products may of course also be mixed with hydrocarbon waxes.

The dispersion used according to the invention is prepared in a simple and conventional manner. The E-AA wax as a starting material, frequently in the form of granules, is advantageously emulsified with the required amount of water and the appropriate amount of a base in an emulsification autoclave under from 4 to 6 bar and at from 140° to 160° C., while stirring.

If desired, a hydrocarbon wax to be employed, in the form of the melt, is dispersed in the mixture with vigorous stirring, advantageously with the aid of an Ultraturrax apparatus, at temperatures above the melting point of the wax and under atmospheric pressure, or a wax based on polyethylene oxidation products and to be employed, if appropriate in the form of the dispersion defined above, is dispersed in the mixture. As stated above, waxes based on polyethylene oxidation products are advantageously added in the form of an aqueous dispersion.

A dispersion prepared in this manner, if appropriate containing the above additives, can be applied in a conventional manner and without difficulties to the intended plated or unplated metal surfaces or surfaces of coatings. Application is effected, for example, by airless spraying, with the aid of a pressure gun, by electrostatic coating or by dipping. Application with a brush or roller can also readily be carried out. Subsequent drying is effected, as a rule, by means of infrared light or in a stream of air at from 20° to 60° C., if appropriate by means of hot air. After drying, as a rule films of 1–20 $\mu$m, preferably 15–20 $\mu$m, are obtained, depending on the amount applied and on the solids content of the dispersion used.

For preserving plated metal surfaces, layer thicknesses of, in particular, from 1 to 10 $\mu$m, preferably from 2 to 5 $\mu$m, are produced. A dispersion having a solids content of 15% by weight and applied by the dipping method gives a layer thickness of, for example, about 3 $\mu$m.

The applied protective layer can be removed in a simple manner with hot water at from 80° to 95° C., if necessary with the addition of a conventional surfactant.

The following factors are important with regard to the suitability of the novel system in practice: the resistance of the dry film of about 15–20 $\mu$m to cold water and the ease with which the film can be removed with hot water at about 95° C. Of particular importance is the resistance of the dry film of about 1–10 $\mu$m, in particular to white rust corrosion in zinc surfaces. The applied films are transparent and therefore do not have an adverse effect on the optical impression in respect of gloss or on the ductility.

The relationships between the composition of the novel dispersions and the results obtained in testing the performance characteristics are summarized in the tables below.

Pure paraffin dispersions are unsuitable because the emulsifier, which is always required, results in insufficient resistance to cold water. The combination of paraffin with the emulsion of a wax based on a polyethylene oxidation product also does not possess any resistance to cold water because polyethylene oxidation products can be brought into a conveniently handled, emulsified form only with emulsifiers and alkali. On the other hand, emulsions based on E-AA wax and paraffin or combinations of E-AA waxes and emulsions of polyethylene oxidation products with paraffins exhibit satisfactory resistance to cold water. The E-AA waxes with about the same acrylic acid content but decreasing molecular weights show a trend toward easy removal with hot water.

The E-AA waxes used according to the invention are prepared in a conventional manner by continuous high pressure polymerization of ethylene with acrylic acid in the presence of free radical initiators and may be described, for example, as follows: the polymerization takes place at from 150° C. to 300° C. under from 1000 to 3000 bar. The weight ratio of ethylene to unsaturated carboxylic acid is from 300:1 to 10:1. The mixture contains up to 5% by weight, based on the total amount of monomers, of regulators.

The regulators used are the conventional substances, such as aliphatic aldehydes or 3 to 6 carbon atoms, in particular propionaldehyde or n-butyraldehyde, aliphatic ketones of 3 to 6 carbon atoms, such as acetone or methyl ethyl ketone, olefins of 3 to 6 carbon atoms, such as propene, but-1-ene or pent-1-ene, and $C_3$–$C_5$-alkanes, such as propane, n-butane or n-pentane. Aliphatic aldehydes, such as propionaldehyde or n-butyraldehyde, are preferably used.

From 3 to 25% by weight of the ethylene are converted by a continuous procedure, and the polymer formed is removed continuously from the reaction zone. The polymerization takes place in a single-phase polymerization medium, the ethylene present in a supercritical state serving as a solvent for the reaction mixture and the polymer melt.

The polymerization is carried out, as a rule, with ethylene conversions of not more than 25%. The acrylic acid and the free radical polymerization initiator used are metered separately into the reaction mixture. The regulator required for adjusting the molecular weight can be metered in together with the comonomers or with the free radical initiator.

EXAMPLES

Parts are by weight, unless stated otherwise.

PREPARATION OF E-AA WAXES

EXAMPLE 1

A mixture of 298 kg/h of ethylene, 11.9 kg/h of acrylic acid and 5.56 kg/h of propionaldehyde was passed continuously through a 10 l stirred autoclave maintained under 2300 bar, at 91° C. By continuously adding 283.8 g/h of tert-butyl perpivalate in a solvent, the temperature in the autoclave reactor was kept at 219° C. The 42 kg/h of polymer obtained after the reaction mixture had been let down corresponded to a conversion of 14.1%, based on the ethylene throughput. The polymer contained 22.7% by weight of acrylic acid and had an MFI (125/325) of 500 or a melt viscosity at 120° C. of 2600 mm²/s.

Examples 2 to 7 were carried out as described in Example 1, the parameters which differ being shown in Table 1.

PREPARATION OF WAX DISPERSIONS ACCORDING TO THE INVENTION

EXAMPLE I (a) 140 parts of an E-AA wax containing 21.2% of acrylic acid (corresponding to Example 2), 25 parts of aqueous 25% strength ammonia solution and 535 parts of water were heated in a stirred kettle under superatmospheric pressure of from 4 to 6 bar and at from 140° to 160° C., while stirring, until a homogeneous emulsion was formed. This took about 1 hour. After the emulsion had cooled, the solids content was determined as 20–21%, the pH as 9.6 and the mean particle size as about 1 µm.

(b) 50 parts of the dispersion obtained under (a) are diluted with 9.5 parts of water, and 40 parts of molten paraffin having a melting range of from 44° to 46° C. and 0.1 part of a fluorine surfactant, as a leveling agent, were emulsified at 60°–70° C. with the aid of an Ultraturrax, and the mixture was then rapidly cooled. A dispersion having a solids content of about 50% and a mean particle size of about 1.1 µm was obtained.

The dispersion obtained in each case was applied in a thin layer directly onto freshly coated test panels with the aid of a knife coater. Drying was effected by exposure for a short time, i.e. only a few minutes, to an infrared lamp to give a satisfactory, closed, water-resistant film which protected the coated metal from corrosive and other adverse environmental effects and could be removed with the aid of hot water under pressure; after the said film has been removed, the finishes are in a satisfactory state.

Examples II to VII were prepared as described in Example I, parameters which differ being shown in Table 2. The results obtained in testing the performance characteristics are also summarized in Table 2. Examples VII–IX are comparative examples.

TABLE 1

| | Preparation of E-AA waxes | | | | | | | | | | |
|---|---|---|---|---|---|---|---|---|---|---|---|
| Example No. | Pressure (bar) | T max. (°C.) | T mixture (°C.) | Ethylene throughput (kg/h) | Amount of AA metered in (kg/h) | Amount of TBPPI metered in (g/h) | Amount of PA metered in (kg/h) | Output (kg/h) | Ethylene conversion (%) | AA content (% by weight) | MFI 125/325 (g/10 min) | Melt viscosity (120° C.; (mm²/s) |
| 1 | 2300 | 219 | 91 | 298 | 11.9 | 283.8 | 5.56 | 42 | 14.1 | 22.7 | 500 | 2600 |
| 2 | 2300 | 220 | 96 | 284 | 10.3 | 182.1 | 0.58 | 38 | 13.4 | 21.2 | 3 | |

TABLE 1-continued

Preparation of E-AA waxes

| Example No. | Pressure (bar) | T max. (°C.) | T mixture (°C.) | Ethylene throughput (kg/h) | Amount of AA metered in (kg/h) | Amount of TBPPI metered in (g/h) | Amount of PA metered in (kg/h) | Output (kg/h) | Ethylene conversion (%) | AA content (% by weight) | MFI 125/325 (g/10 min) | Melt viscosity (120° C.; mm²/s) |
|---|---|---|---|---|---|---|---|---|---|---|---|---|
| 3 | 2300 | 220 | 91 | 314 | 11.3 | 155.0 | 1.46 | 43 | 13.7 | 20.0 | 16 | |
| 4 | 2300 | 219 | 92 | 293 | 10.3 | 197.6 | 1.62 | 39 | 13.3 | 19.0 | 40 | |
| 5 | 2300 | 218 | 90 | 295 | 11.1 | 209.2 | 3.47 | 41 | 13.9 | 21.8 | 92 | |
| 6 | 2300 | 219 | 92 | 285 | 11.1 | 210.4 | 4.50 | 39 | 13.7 | 21.1 | 190 | 12000 |
| 7 | 2300 | 215 | — | — | — | 290 | — | — | — | 15.0 | — | 2000 |

AA = acrylic acid
TBPPI = tert-butyl perpivalate
PA = propionaldehyde

TABLE 2

Testing of performance characteristics

| Dispersion example | Wax according to Example | Aqueous formulation | | Paraffin (% by weight) | Resistance[1] to cold water | Ease of removal[2] with water at 95° C. |
|---|---|---|---|---|---|---|
| | | E-AA (% by weight) | Amine | | | |
| I | 2 | 10 | 100 mol % NH₃ | 40 | very good | 90–100% |
| II | 3 | 10 | 92 mol % DME | 40 | very good | 90–100% |
| III | 4 | 15 | 100 mol % NH₃ | 30 | very good | 90–100% |
| IV | 5 | 10 | 100 mol % NH₃ | 40 | very good | 90–100% |
| V | 6 | 15 | 90 mol % DEE | 40 | very good | 90–100% |
| VI | 1 | 10 | 100 mol % NH₃ | 50 | very good | 90–100% |
| VII (Mixture of Example VI with PE oxidation product[3] and paraffin) | | 5<br>5 | 100 mol % NH₃<br>PE oxidation product | 40 | good – very good | about 100% |
| VIII (Aqueous paraffin emulsion with emulsifier) | | — | | | insufficient (is slightly emulsified) | about 100% |
| IX (Emulsion of PE oxidation product[3] and paraffin) | | 10 | PE oxidation product | 40 | insufficient (is slightly emulsified) | 90–95% |

DME = dimethylethanolamine
DEE = diethylethanolamine
[3] = emulsion of polyethylene oxidation product (PE oxidation product), consisting of 27% by weight of PE oxidation product, 7% by weight of a C₁₀ oxoalcohol with 7 moles of ethylene oxide and 0.5% by weight of KOH and water to make up to 100%
[1] = dry film surface (film thickness 15–20 μm) is exposed to a jet of cold water (water temperature 20° C.) for 30 minutes.
[2] = the dry film surface of the sample is brushed 30 times continuously with a sponge in the presence of water at 95° C. Percentages are based on the amount removed after the treatment.

(1) = dry film surface (film thickness 15–20 μm ) is exposed to a jet of cold water (water temperature 20° C. ) for 30 minutes. (2)=the dry film surface of the sample is brushed 30 times continuously with a sponge in the presence of water at 95° C. Percentages are based on the amount removed after the treatment.

PREPARATION OF NOVEL WAX DISPERSIONS ESPECIALLY FOR PLACED METAL SURFACES

EXAMPLE X 100 parts of an E-AA wax containing 21.2% of acrylic acid (corresponding to Example 2), 14 parts of dimethylethanolamine and 286 parts of water are heated in a stirred kettle under superatmospheric pressure of from 4 to 6 bar and at 100° to 160° C., while stirring, until a homogeneous emulsion has formed. This takes about two hours. After the emulsion has cooled, the solids content is determined as 28.5%, the pH as 8.5 and the mean particle size as about 1 μm.

The resulting dispersion is brought to a solids content of 15% by dilution with water and applied directly onto a plated test panel by dipping. Drying is effected in a drying oven at 60° C. to give a satisfactory, closed water-resistant film which protects the substrate from corrosion and other adverse environmental effects.

Examples XI to XIV were prepared as described for Example X, parameters which differ being shown in Table 3. The results obtained in testing the performance characteristics are also summarized in Table 3.

TABLE 3

Testing of performance characteristics

| Example | Wax according to Example | Amine/degree of neutralization, mol % | Layer thickness μm | Dried at (°C.) | Salt spray test, DIN 53167 (hours) | Assessment |
|---|---|---|---|---|---|---|
| X | 2 | DMEA/100 | 3 | 60 | 240 | 1, clear |
| XI | 3 | DMEA/100 | 3 | 60 | 240 | 2, clear |

TABLE 3-continued

| Example | Wax according to Example | Amine/degree of neutralization, mol % | Layer thickness μm | Dried at (°C.) | Salt spray test, DIN 53167 (hours) | Assessment |
|---|---|---|---|---|---|---|
| XII | 1 | DEEA/100 | 5 | 60 | 240 | 2, dull |
| XIII | 2 | TEA/100 | 3 | 60 | 240 | 1, clear |
| XIV | 7 | DMEA/100 | 2 | 60 | 240 | 2, clear |
| | Comparison: | | | | | |
| XV | AA/AN copolymer (commercial product) | | 3 | 120 | 240 | 2, clear |
| XVI | Alkyd resin based on phthalate (commercial product) | | 3 | 60 | 240 | 2, clear |
| XVII | Untreated panel, zinc-plated | | — | — | 160 | 3 |

DMEA = dimethylethanolamine
DEEA = diethylethanolamine
TEA = triethanolamine
AA/AN = acrylic acid/acrylonitrile
Assessment:
1 = hardly an attack
2 = slight attack
3 = pronounced attack

We claim:

1. A liquid preservative for metal surfaces and surfaces of coatings, in the form of an aqueous wax dispersion, wherein the said dispersion contains from 10 to 30% by weight of an ethylene/acrylic acid copolymer wax, consisting of from 8 to 25% by weight of acrylic acid units and from 92 to 75% by weight of ethylene units, the percentages being based on the acid form of the wax, and water to make up to 100% by weight, the ethylene/acrylic acid copolymer wax in the acid form having a melt viscosity of not less than 1000 mm2/s, measured at 120° C., as a lower limit and an MFI of not less than 1, measured at 125° C. and 325 g, as an upper limit, and from 50 to 100 mol % of the carboxyl groups of the ethylene/acrylic acid copolymer wax are neutralized.

2. A liquid preservative as claimed in claim 1, wherein the ethylene/acrylic acid copolymer wax consists of from 12 to 22% by weight of acrylic acid and from 88 to 78% by weight of ethylene.

3. A liquid preservative as claimed in claim 1, wherein from 65 to 100 mol % of the carboxyl groups are neutralized.

4. A liquid preservative as claimed in claim 1, wherein the ethylene/acrylic acid copolymer wax has a melt viscosity of 2000 mm²/s as a lower limit and an MFI of not less than 10 as an upper limit.

5. A liquid preservative as claimed in claim 1, wherein the aqueous wax dispersion contains from 15 to 25% by weight of an emulsion of a wax based on a polyethylene oxidation product, consisting of from 20 to 27% by weight of a wax based on a polyethylene oxidation product and having an acid number of from 18 to 25 and a molecular weight of from 2000 to 10000, from 0.5 to 0.8% by weight of an alkali metal hydroxide and water to make up to 100% by weight, the percentages being based on the weight of the said dispersion, with the proviso that the total dispersion has a solids content of from 10 to 35% by weight.

6. A liquid preservative as claimed in claim 1, wherein the aqueous wax dispersion contains from 40 to 80% by weight, based on the total weight of the said dispersion, of a polyethylene wax having a molecular weight of from 500 to 6000 and a melting point of from 40° to 110° C., or a paraffin having a melting point of from 40° to 100° C., with the proviso that the total dispersion has a solids content of from 30 to 65% by weight.

7. A liquid preservative as claimed in claim 1, wherein the aqueous wax dispersion contains from 25 to 100% by weight of an emulsion of a wax based on a polyethylene oxidation product, consisting of from 20 to 27% by weight of a wax based on a polyethylene oxidation product having an acid number of from 18 to 25 and a molecular weight of from 2000 to 10000, from 0.5 to 0.8% by weight of an alkali metal hydroxide, from 2.5 to 2.8% by weight of a nonionic emulsifier and water to make up to 100% by weight, and from 15 to 200% by weight of a synthetic or natural hydrocarbon wax, with the proviso that the total dispersion has a solids content of from 30 to 65% by weight, the percentages being based on the weight of the said dispersion.

8. A process for temporarily preserving metal surfaces and surfaces of coatings, wherein an aqueous wax dispersion as claimed in claim 1 is applied onto the metal surfaces or surfaces of coatings and dried.

9. A process for preserving plated metal surfaces, wherein an aqueous wax dispersion as claimed in claim 1 is applied onto the plated metal surface and dried at from 30° to 60° C.

* * * * *

UNITED STATES PATENT AND TRADEMARK OFFICE
CERTIFICATE OF CORRECTION

PATENT NO. : 4,693,909

DATED : September 15, 1987

INVENTOR(S) : Walter Ziegler, et al

It is certified that error appears in the above-identified patent and that said Letters Patent is hereby corrected as shown below:

On the title page insert foreign application priority data

--(30) April 6, 1985 (GR) Fed. Rep. of Germany    3512564
        July 4, 1985 (GR) Fed. Rep. of Germany    3523860 --.

Signed and Sealed this

First Day of March, 1988

Attest:

DONALD J. QUIGG

Attesting Officer      Commissioner of Patents and Trademarks